US 12,134,586 B1

United States Patent
Vasquez

(10) Patent No.: US 12,134,586 B1
(45) Date of Patent: Nov. 5, 2024

(54) FERTILIZER MADE FROM FISH BY-PRODUCTS

(71) Applicant: Anthony Vasquez, Riverside, CA (US)

(72) Inventor: Anthony Vasquez, Riverside, CA (US)

( * ) Notice: Subject to any disclaimer, the term of this patent is extended or adjusted under 35 U.S.C. 154(b) by 874 days.

(21) Appl. No.: 17/233,231

(22) Filed: Apr. 16, 2021

Related U.S. Application Data

(63) Continuation-in-part of application No. 16/280,764, filed on Feb. 20, 2019, now abandoned.

(60) Provisional application No. 62/659,212, filed on Apr. 18, 2018.

(51) Int. Cl.
*C05F 11/00* (2006.01)
*C05F 1/00* (2006.01)

(52) U.S. Cl.
CPC .............. *C05F 11/00* (2013.01); *C05F 1/002* (2013.01)

(58) Field of Classification Search
None
See application file for complete search history.

(56) References Cited

U.S. PATENT DOCUMENTS

| | | | |
|---|---|---|---|
| 2,003,887 A * | 6/1935 | Hopkinson | C05F 1/002 |
| | | | 159/DIG. 25 |
| 5,634,959 A | 6/1997 | Beaty | |
| 6,273,927 B1 | 8/2001 | Yang | |
| 7,678,171 B2 | 3/2010 | Becklet et al. | |
| 7,927,397 B1 | 4/2011 | Evans | |
| 9,738,566 B2 | 8/2017 | Thomsen et al. | |
| 2005/0086987 A1 | 4/2005 | Shetty | |
| 2011/0247378 A1 | 10/2011 | Begley et al. | |
| 2015/0135784 A1 * | 5/2015 | Milnes | C05F 1/002 |
| | | | 435/290.2 |

FOREIGN PATENT DOCUMENTS

WO  WO-2011060126 A2 *  5/2011  ............... C05C 1/00

OTHER PUBLICATIONS

Shetty "Particle Size to Screen Mesh Conversion Chart" www.sweco.com.

* cited by examiner

*Primary Examiner* — Wayne A Langel
(74) *Attorney, Agent, or Firm* — Kirk A. Buhler; Buhler & Associates Patenting

(57) ABSTRACT

Improvements in fertilizer is disclosed. The fertilizer is made by processing fish or other aquatic animal by-products to utilize parts of a fish that are normally discarded. The discarded part of a fish such as the head, fins, tail and bones. These components are typically tossed into the ocean where they decompose or are scavenged by other sea creatures. The by-products are separated based upon the mineral strength of the fertilizer that will be produced from the by-products. Different parts of fish and ocean material have different nutritional and decomposing properties. The separation of the components such as the head from the fins/tail, from the blood and ocean products. The extraction of the minerals provides the essential nutritional value for the fertilizer. The minerals and nutrients are used to enhance growth to plants or soil to increase the production of flowering, fruits, vegetables and growth.

15 Claims, 4 Drawing Sheets

FERTILIZER MADE FROM FISH BY-PRODUCTS

CROSS REFERENCE TO RELATED APPLICATIONS

Figure 1:
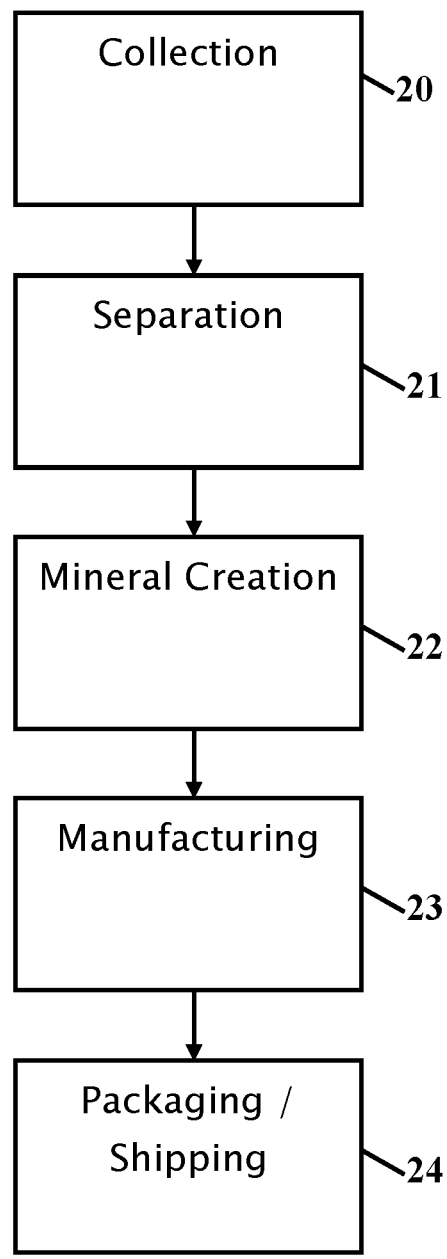

This application claims the benefit of utility application Ser. No. 16/280,764 filed Feb. 20, 2019 that claims priority to provisional Application Ser. No. 62/659,212 filed Apr. 18, 2018 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in fertilizer. More particularly, the present fertilizer that is made from fish by-products. The fertilizer is processed to provide nutrients for plants enhance growth.

Description of Related Art including information disclosed under 37 CFR 1.97 and 1.98.

All plants can benefit from the addition of fertilizer to increase growth and to make the plant healthier. Fertilizers are made from a variety of products and sources from decomposed organic material, animal droppings or other products or by-products. A less common source to make fertilizer is from fish or other aquatic animal by-products that would normally be discarded into the ocean, placed down a drain or placed into a landfill.

A number of patents and or publications have been made to address these issues. Exemplary examples of patents and or publication that try to address this/these problem(s) are identified and discussed below.

U.S. Pat. No. 5,634,959 issued on Jun. 3, 1997 to Clayton Beaty is titled Soluble plant food containing micronutrients. This patent discloses a dry flowable fertilizer mixture is provided that contains soluble seaweed extract and fish solubles. Chelated trace elements and micronutrients available from seaweed and fish solubles can thereby be made available to plants by applying a dilute solution of the fertilizer mixture. While this patent discusses the use of some fish solubles, the solubles are not derived from the solids of a fish, such as bones, tail etc.

U.S. Pat. No. 6,273,927 issued on Aug. 14, 2001 to Dae Youn Yang is titled Manufacturing method of fertilizer made from organic wastes. This patent discloses a method of manufacturing the fertilizer made from organic wastes such as food wastes, human excrements, animal excrements, slaughterhouse waste, henhouse waste, fish and shellfish wastes, vegetable wastes and agricultural wastes. As the various organic wastes are changed to organic fertilizer, the acidified soil is improved, the environmental contamination can be prevented, and the high moisturizing and the fine porous of the soil prevent drought and fertilizer loss so as to raise fertilizing efficiency. The fertilizer in this patent is from organic waste and does not focus on using specific elements of a fish to obtain the desired fertilizer that is configured for certain plant types.

U.S. Pat. No. 7,678,171 issued on Mar. 16, 2010 to Michael Becklet et al., is titled Process of preparing soil additive of fertilizer from fish. This patent discloses a process for preparing fertilizer from fish, and a fertilizer prepared from said process. The fertilizer is for use on soil and plants. The process involves hydrolysis of fish with a phosphorus containing acid, preferably an inorganic phosphorus-based acid, under normal ambient conditions. Typically, phosphoric acid is used. The fertilizer prepared from the disclosed process contains 1 to 10% by weight of the phosphorus-based acid. In this patent the entire fish is utilized with an acid additive. It does not utilize just the parts of a fish that are discarded.

U.S. Pat. No. 7,927,397 issued on Apr. 19, 2011 to Jacob Matthew Evans is titled Concentrated separator by-product and fish soluble by-product-based fertilizer. This patent discloses a concentrated separator by-product and fish soluble by-product-based fertilizer product is created by mixing concentrated separator by-product, a by-product of the de-sugaring of beet molasses, and fish soluble by-product, a by-product of the production of fish meal. The raw mixture of concentrated separator by-product and fish soluble by-product is then heat treated and optionally filtered to remove suspended particular matter. The heat-treated mixture of concentrated separator by-product and fish soluble by-product is then cooled to yield the concentrated separator by-product and fish soluble by-product-based fertilizer product.

What is needed is a fertilizer for plants that is made from fish by-products that are discarded in the cleaning process of fish or other aquatic animal and utilized specific parts in different types of plant fertilizer. The proposed fertilizer made from fish or other aquatic animal by-products provides the solution.

BRIEF SUMMARY OF THE INVENTION

It is an object of the fertilizer made from fish by-products to utilize parts of a fish or other aquatic animal that are normally discarded. The discarded part of a fish such as the head, fins, tail and bones. These components are typically tossed into the ocean where they decompose or are scavenged by other sea creatures. Rather than discarding these parts, this document provides a mechanism to utilize the by-products to provide nutrients to land plants.

It is an object of the fertilizer made from fish by-products for the fish and ocean material to be extracted a distance from the shoreline where sea weed is undisturbed. Collecting the fish and material at a distance from the shoreline reduces or eliminates contamination from and pollution and ensures that the material does not contain lead or other unanticipated elements.

It is another object of the fertilizer made from fish by-products for the by-products to be separated based upon the strength of the fertilizer that will be produced from the by-products. The different parts of fish or other aquatic animal and ocean material have different nutritional and decomposing properties. The separation of the components such as the head from the fins/tail, from the blood and ocean products, such as seaweed allows for separate processing as well as grouping the material for different post processing and in different profit categories for use. As an example, the head has greater fertilizing properties than the blood, and the tail and fin have nutritional properties between the head and blood.

It is still another object of the fertilizer made from fish by-products to produce minerals from the by-products. The extraction of the minerals provides the essential nutritional value for the fertilizer. The minerals and nutrients are used to enhance growth to plants or soil to increase the production of flowering, fruits, vegetables and growth.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

Figure 2:
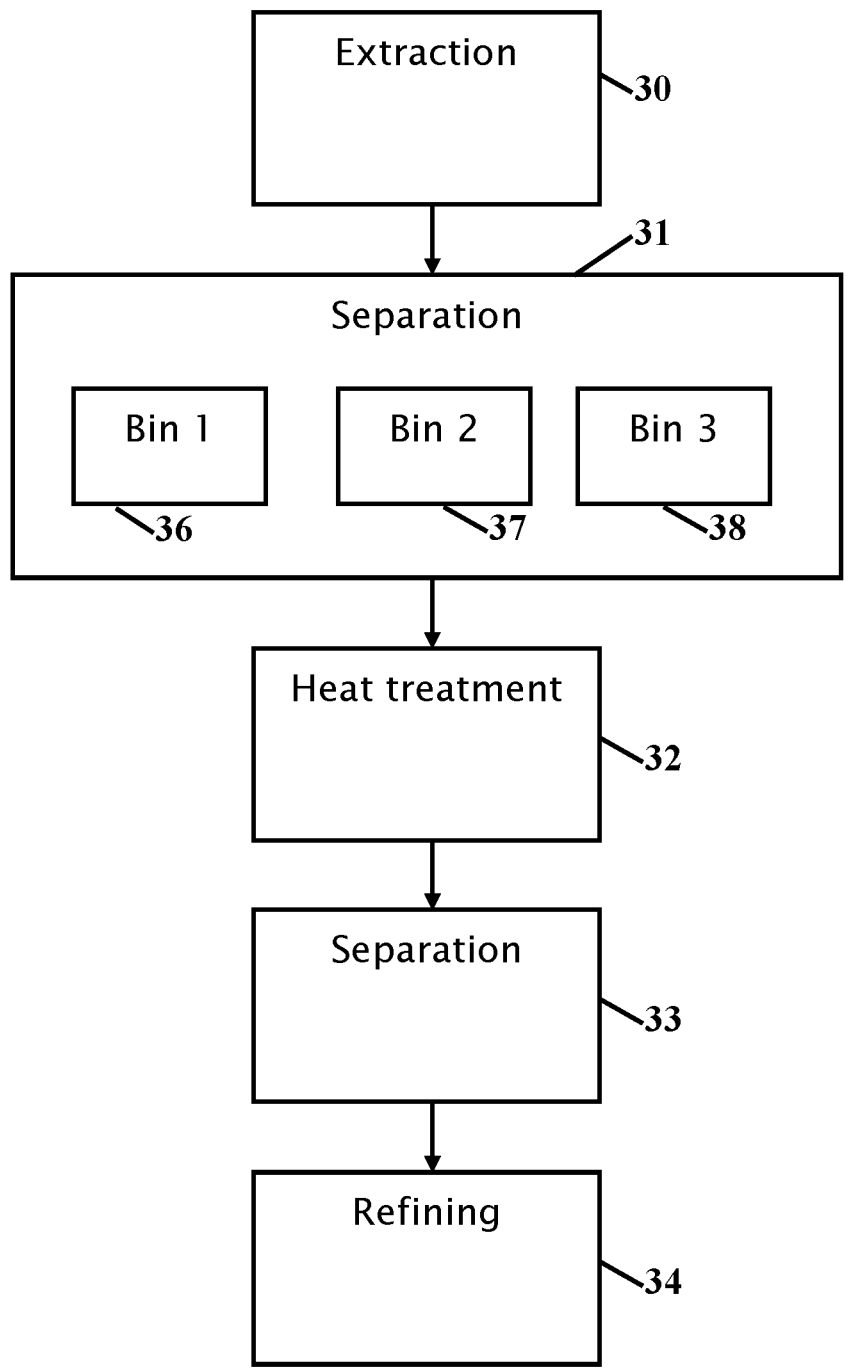
Figure 3:
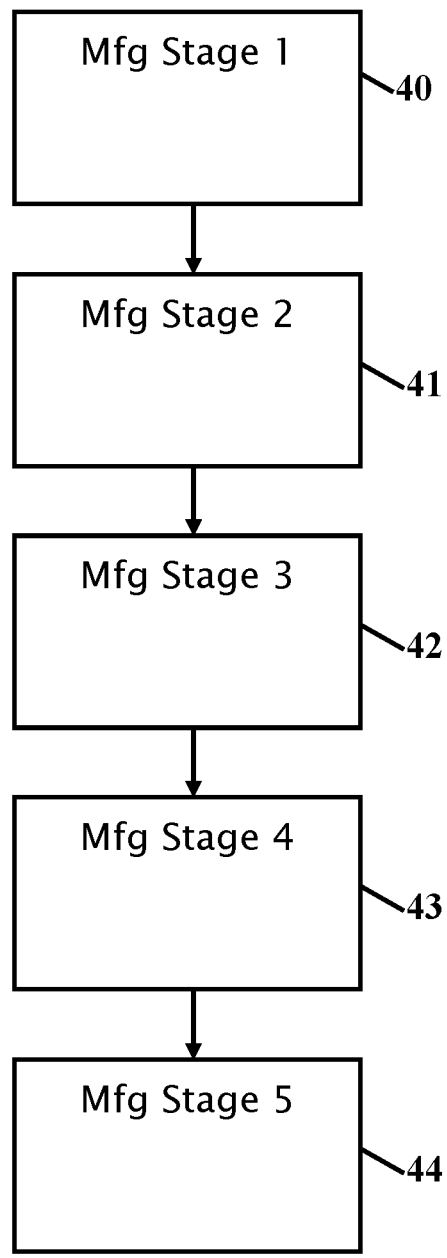
Figure 4:
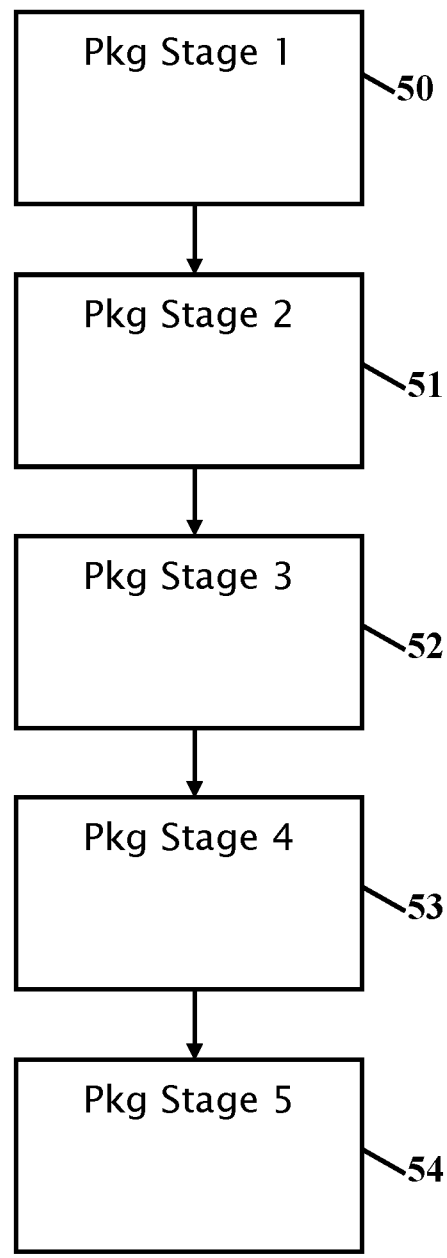

FIG. 1 shows an overall flow chart from collection to delivery of the fertilizer made from fish by-products.
FIG. 2 shows a flow chart of mineral creation.
FIG. 3 shows a flow chart of manufacturing.
FIG. 4 shows a flow chart of packaging.

DETAILED DESCRIPTION OF THE INVENTION

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, but is merely representative of various embodiments of the invention. The illustrated embodiments of the invention will be best understood by reference to the drawings, wherein like parts are designated by like numerals throughout.

| Item Numbers and Description |
| --- |
| 20 collected |
| 21 separated |
| 22 mineral creation |
| 23 manufacturing |
| 24 shipping |
| 30 extraction |
| 31 separation |
| 32 heat treatment |
| 33 separation |
| 34 refinement |
| 36 first bin |
| 37 second bin |
| 38 third bin |
| 40 manufacturing Stage 1 |
| 41 manufacturing Stage 2 |
| 42 manufacturing Stage 3 |
| 43 manufacturing Stage 4 |
| 44 manufacturing Stage 5 |
| 50 packaging Stage 1 |
| 51 packaging Stage 2 |
| 52 packaging Stage 3 |
| 53 packaging Stage 4 |
| 54 packaging Stage 5 |

FIG. 1 shows an overall flow chart from collection to delivery of the fertilizer made from fish by-products or another aquatic animal. Other aquatic animals can include alligator, squid, octopus, shell fish by-products. The base material is typically collected 20 from fish and ocean material that is collected and extracted from boats that are typically 30 miles or more off shore where the fish and sea weed is undisturbed but can be collected closer to shore or in fresh or brackish water areas. At this distance from the shore, land-based pollutions are typically non-existent. Standard fishing regulations allows fishing and capture of ocean particles. Fish or other aquatic animal are brought back in a hemp sack. The hemp sack is used to hold the ocean-based minerals and start the drying process.

Once the hemp sacks that contain the material are transferred to the shore the edible or market material is separated 21 from the by-products or material that is often tossed into the ocean. The collected material is separated into barred sand bass, Paralabrax nebulifer. This is a type of sea bass that lives mainly off the coast of California. Seaweed is separated and seaweed refers to several species of macroscopic, multicellular, marine algae. The term includes some types of red, brown, and green algae. Other fish are separated as sculpin which is a type of fish that belongs to the superfamily Cottoidea in the order Scorpaeniformes. As of 2006, this superfamily contains 11 families, 149 genera, and 756 species.

Mineral creation 22 that is essentially cleaned from fish, sand and seaweed and the fish or other aquatic animal is further cleaned by removing the head, fins, tail, bones, legs, tunicles, shell from the fish, sand from small islands, seaweed and by products. In this process the blood is also collected for processing. Each part of the fish or other aquatic animal is binned depending upon the resulting strength of the end product that will be produced by the different parts of the fish, seaweed and by-products. The different resulting strengths will be further defined and explained herein.

Manufacturing 23 involves draining and drying the collected materials. The materials must be converted from their raw form to a condition where they resemble pellets or powder or liquid that can be more easily dispensed by the end user. Native mercury, crystallizes at −39° C., and water which freezes below 0° C. Freezing the water separates the mercury from liquids and minerals to extract the minerals. In this manufacturing an industrial grinder is used with an industrial heater with an industrial strainer, Heating Ventilation Air Conditioning (HVAC) regulated ventilation system is used.

Packaging/shipping 24 includes placing the powder, pellets or liquid in a box, container or bag for whole sale or retail sale. The manufacturing uses an industrial air lock packaging system that measured by weight and the potency level. The potency Level is based on the mineral density and less dirt. The packaging and potent level based on mineral amount, amount of organic natural dirt and total package weight. The finished product is then shipped to a distributor, retailer or user for consumption or use.

FIG. 2 shows a flow chart of mineral creation. There are several Stages for material creation. In the embodiment disclosed the Stages are extraction 30, separation 31, heat treatment 32, separation 33 and refining 34. In Stage 1 of mineral creation/extraction 30, the fish and ocean material are extracted from the ocean using nets, hooks or other fishing methods. The extraction is performed by fishing vessels at a distance of 30 miles or more off shore where the fish and sea weed are undisturbed and city or land-based contamination is non-existent or at minimal levels but can be from fresh water or brackish water locations as well.

Minerals extracted can be described by their various physical properties, which are related to their chemical structure and composition. Common distinguishing characteristics shown during and after manufacturing include; crystal structure, mineral dust, fish bone fragments. Minerals are classified by key chemical constituents During the manufacturing process the mineral breakdown constitute approximately 75% of the Earth's crust natural nutrients. Native elements commonly found during the manufacturing process includes, but is not limited to, algae, sulfides, oxides, halides, carbonates, sulfates and phosphates.

Extracted minerals from ocean (Kelp, Fish, Fish Bone Fragments and are placed on natural dirt at room temperature (25° C.) Metastable. The minerals are in solid raw form when extracted. The extracted minerals are represented by a chemical formula. Minerals are chemical compounds, can be described by fixed or a variable formula. Minerals are extracted by chopping or grinding the bone fragments with an industrial grinder. In stage 1 product results have indicated that marine bone and fish fragments are rich in sodium (155.7 to 346.4 mg) and calcium (89.0 to 376.5 mg). The minerals and deposits are preserved by using an industrial heater at temperatures of 45-95 degrees Centigrade an passed through an industrial strainer for 1 to 10 days. The curing results are based on fish type.

Manufacturing Stage 1 is mineral composition separation. The head of the body contains a different concentration level of minerals. The head is processed at a temperature of 80 to 90 degrees. At this temperature the head is separated from other parts, split in half and placed into a bin. The head is then process with natural desert dirt and tested to ensure there is no undesirable chemicals. The dirt is then placed into the bin with the split head and packed thereby allowing absorption of the minerals from the head into the desert dirt. The desert sand is then place into a heater element dehydration-based system for a minimum of 5 days. The combination of the split head and desert dirt is then placed into a sifter where stage 1 minerals fall into the bin.

Ocean minerals ocean products ocean fish material is placed in a hemp bag, or equivalent. The bag absorbs all liquid, salt and ocean minerals. The bag is then placed in an air tight bag or sealed container with 1-15% oxygen or less. Standard fishing regulations allows fishing and capture of ocean particles such as seaweed or other natural growths. Fish are brought back in a hemp sack. The hemp sack is used to hold the ocean-based minerals and start the drying process.

Manufacturing Stage 2 of mineral creation/separation 31. In this Stage the hemp sack is placed on the 10"×10" Metal Table. The fish, sand particles and ocean particles are separated by type. Fish including ocean particles with Poison parts is placed in container 1. Ocean particles without poison are placed in container 2. The separation of the ocean particles can be further separated as fish scales, fish tongue, fish eyes, field dirt and tree droppings. In stage 2, potassium, sodium and calcium mineral extraction takes place. Potassium is extracted at 180.0 to 260.6 mg per kilogram of marine fish, magnesium, iron, and zinc at 0.74 to 2.25 mg per kilogram in marine fishes.

Manufacturing Stage 2 mineral separation re-dehydration. The bin is then re-compressed with desert dirt and replaced back into the dehydration system for an additional 2 days. At this stage of mineral separation for manufacturing stage 2 dehydration, the brain fragments brain parts, and minerals extracted from the core of the body is in powder form.

The fish particles or other aquatic animal are further separated by type. Fish heads are placed in a first bin. The material in the first bin/container 36 that is used for fertilizer that is labeled triple strength. Fish minerals, Fish fins and tails are placed in a second bin/container 37 or hemp bag, that is used for fertilizer that is labeled double strength. All other ocean particles and elements including excess blood is placed in a third bin 38 and is used for standard fertilizer like natural dirt that captures all liquids from bin 1 and bin 3. While three bins are shown and described, less than three bins or more than three bins can be used as the process is refined and improved.

Manufacturing Stage 3 of mineral creation/heat treatment 32. In heat treatment the material is dried over a period of time at a low temperature to remove moisture from the material. The drying temperature is typically between a temperature of between 100 to 130 degrees Centigrade and the drying takes about three days to complete. While these temperatures and duration is provided in this embodiment the temperature and duration can be adjusted based upon factors such as, but not limited to, the type of material being heat treated, the thickness of the material, starting temperature of the material and environmental conditions such as temperature and humidity. The material being heat treated is typically fish fins, fish tails, fish heads, seaweed and fish bone fragments. The minerals are heat treated in each bin separately under a heat-treated environment between 85-115 degrees Centigrade.

Manufacturing Stage 3 mineral is for separation and extraction of bone extracted from bone fragments from the remaining parts of the fish head. Minerals are then packed into a packing box. Minerals are re-hydrated for one day. The minerals are then placed into a bone grinding system where the last minerals of the fish that are classified as bone fragments are grinded with the desert dirt.

The heat treatment 32 in manufacturing Stage 3 removes moisture from the material making the fish fins, fish tails, fish heads, seaweed and fish bone fragments easy to shred or grind for further separation of the dried materials. Manufacturing Stage 4 of mineral creation/separation 33. After all minerals are separated by type, the extraction process starts. All particles are cut to thin pieces. Bone fragments and sea particles are cut to a thickness of about one-inch long. Each particle is placed on dirt that has been ground to almost dust. The bone fragments and particles are noticeably absorbed into the dirt. The dirt shows visible signs of water/oil around the particles. The particles sit in the dirt for approximately 24 hours. In this Stage the tools required are a metal sheet of about 10 inches by 10 inches, industrial scissors, industrial metal clamps, and industrial strainer and industrial smell resistant bags. Minerals are ground by an industrial grinder. Bin 2 includes minerals that can be shredded into a dust. All minerals that cannot be refined into dust are placed in Bin 3.

Bin 1 and bin 2 are combined with bin 3 that includes natural dirt that is used as a bonding material that improves the concentration of the fertilizer. This allows the fertilizer to be manufactured and classified by potent level. As an example, standard strength, double strength and triple strength. While these tools are disclosed, they do not imply requirements to separation and extraction of the mineral creation.

Manufacturing Stage 4 is for lower mineral concentration level are collected. The remaining parts of the body are used except for the fillet that is a portion natural meat portion of the fish side. This area is commonly classified as the meat. This portion allows the ecosystem to stay in place where natural life of all the fish is redistributed back and the bone fragments are kept commercially by way of the preservation of the minerals. The remaining bone fragments are then compact with desert dirt in a dehydration process that takes place for 2 days. After the 2 days of dehydration is complete the remaining portion of the fish is placed into a separate bin that is combined with tree bark and desert dirt.

Manufacturing Stage 5 of mineral creation/refining 34. After binning the material into the three bins and the particles have been refined. Minerals are refined again by an industrial grinder. the refine minerals are used in dust form and absorb in the plant improving the plant cell repair time in half. the refined minerals are packaged as plant revitalizer. The process continues with the use of an industrial bag sealer to seal each bag of created minerals. Two sets of industrial fans are used to push air into the working environment and to pull air from the working environment. An industrial blender can be used with an industrial spoon. Dried fish blood can be reconstituted with water.

FIG. 3 shows a flow chart of manufacturing. There are generally five Stages of manufacturing. Manufacturing minerals in bin1 includes manufacturing raw fish minerals. Stage 1 manufacturing requires all minerals are processed in a temperature setting of 85-115 degrees Centigrade. Raw minerals are grinded by an industrial grinder and particles 1-2 ml in size or smaller are refined using bin 3. Stage 1 minerals are classified as standard strength and packaged in a temperature setting of 65 degrees Centigrade or below. In manufacturing Stage 1, 40, the tools that are used includes an industrial strainer, at least one hemp fish sack, but other types of container or sacks are contemplated and at least one industrial fan.

In manufacturing Stage 2, 41, the tools that are used includes an industrial hammer, industrial fork pick and an industrial plastic container. Stage 2 manufacturing utilizes minerals 2-5 ml in size combined with bin 2 and 3. Minerals are processed during the grinding process at a temperature setting of 85-115 degrees Centigrade. Minerals are packaged in temperature setting of 65 degrees Centigrade or below These materials are classified as double strength.

In manufacturing Stage 3, 42, the tools that are used includes heat treated containers, industrial scissors and plastic tarp. Manufacturing Stage 3 manufacturing utilizes minerals 6-10 ml in size combined with bin 2 and 3. Minerals are re heat treated at a temperature of 85-115 degrees Centigrade for a period of 5-7 hours. Each 1 pound is heat treated for 5-7 hours. There is an additional regrind for material that is used in bin 2 and 3. Minerals are packaged in a temperature setting of 65 degrees Centigrade or below. These materials are classified as double strength.

In manufacturing Stage 4, 43, the tools that are used includes an industrial scale to measure the amount that will be sold and packaged, an industrial grinder to pulverize dried material and industrial plastic bags to package finished material for sale. Stage 4 manufacturing utilizes minerals that are 11 ml or more in length and are combined with bin 2 and 3. Minerals are re-heat treated at a temperature of 85-115 degrees Centigrade for a period of 5-7 hours. Each pound is heat treated for 5-7 hours additional and reground using bin 2 and 3. Minerals are packaged in a temperature setting of 65 degrees Centigrade or below. These materials are classified as triple strength.

In manufacturing Stage 5, 44, the tools that are used includes packaging quality assurance, industrial labeling equipment and an industrial sealer. Stage 5 manufacturing utilizes minerals that are 11 ml—or more in length and are combined with material from bin 3. The minerals are re-heat treated at a temperature of 85-115 degrees Centigrade for a period of 5-7 hours. Each pound of material is heat treated for 5-7 hours additional and reground using bin 2 and 3. The minerals are packaged in a temperature setting of 65 degrees Centigrade or below. This material is classified as triple strength or plant revitalizer.

FIG. 4 shows a flow chart of packaging. There are generally five Stages for the packaging of the fertilizer. In packaging Stage 1, 50, the tools used are industrial markers and industrial scissors. Packaging Stage 1, 50 for all minerals include utilizing airtight sealing unit. The airtight sealing unit sucks 95% of the air out of the package. The temperature setting during packaging is maintained at 65 degrees Centigrade or below.

In packaging Stage 2, 51, the tools used are industrial containers and an industrial measuring tape. Packaging Stage 2, 51 includes taking the zip-top sealed package that has 5% or less of air and placing that package in top inside of a disposable airtight bag with 30% or less of air.

In packaging Stage 3, 52, the tools used are a quality assurance seal and an industrial scale. Stage 3 packaging includes a description on how to use pacific fertilizer concentrated application.

In packaging Stage 4, 53, the tools used are smell resistant messenger bag and an industrial sealer. Stage 4 packaging includes a scooper that measures half of an ounce or below of fertilizer to provide consumers with how to use instructions/directions.

In packaging Stage 5, 54, the finished product is positioned for wholesale and/or retail product placement. Stage 5 packaging includes all contents are tightly sealed with proper labeling that explains to the customer how to use pacific fertilizer concentrated formula instructions/directions.

The tools that are used include a bar code for scanning for retail, individual, or bulk sales and an industrial label printer for marking and labeling the end product. The fertilizer product creation disclosed in this document is created to improve the quality of soil and grow plants on and natural ocean-based minerals.

Thus, specific embodiments of a fertilizer made from fish by-products or aquatic animal have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:
1. A method of making three strengths of fertilizer from fish by-products comprising:
    a collection of the ocean material;
    a separation of said collected ocean material;
    a mineral creation from said separated and said collected ocean material;
    wherein said mineral creation is with a manufacturing stage 1 that includes separating heads from other parts, splitting the heads in half and placed into a bin with desert dirt, a heating and a drying of said separated collected ocean material at a temperature of between 100 and 130 degrees Centigrade for a minimum of three days to remove moisture from said separated collected ocean material and allowing absorption of minerals from the head into the desert dirt;
    a manufacturing stage 2 where potassium, sodium and calcium are extracted from at least one of the fish by-products or ocean materials by extracting the brain fragments brain parts, and body minerals extracted from a core of a fish body in powder form;

said potassium has a concentration of between 180.0 to 260.6 mg per kilogram in marine fish;

said mineral creation of magnesium has a concentration of between 31.2 to 40.7 mg per kilogram in marine fish, iron has a concentration of between 0.85 to 2.22 mg per kilogram in marine fish, and zinc has a concentration of between 0.74 to 2.25 mg per kilogram in marine fishes;

said fish by-products are further separated with fish heads placed in a first container to create triple strength fertilizer;

said fish by-products are further separated with fish minerals, fish fins and tails placed in a second container to create double strength fertilizer;

said fish by-products are further separated with ocean particles and blood that have any level of poison being placed in a third container to create a single strength fertilizer and further includes a manufacturing stage 3 that utilizes said fish minerals 6-10 particle size unit mil grade in size combined with material in said second container and said third container;

said fish minerals are then placed into a bone grinding system where the last minerals of the fish that are classified as bone fragments are grinded with the desert dirt;

a re-heating of said treated material at a temperature of 85-115 degrees Centigrade for a period of 5-7 hours, then grinding said material and packing said material at a temperature of 65 degrees Centigrade or below;

a manufacturing of said mineral creation to create a manufactured created mineral, and a packaging of said manufactured created mineral.

2. The method of making three strengths of fertilizer from fish by-products according to claim 1, further includes a manufacturing stage 4 where remaining bone fragments are then compact with desert dirt in a dehydration process that takes place for 2 days.

3. The method of making three strengths of fertilizer from fish by-products according to claim 2, wherein after the 2 days of dehydration is complete the remaining portion of the fish is placed into a third bin that is combined with tree bark and desert dirt.

4. The method of making three strengths of fertilizer from fish by-products according to claim 3, further includes a manufacturing stage 5 where minerals are refined again by an industrial grinder to turn the minerals into dust form and are packaged as a plant revitalizer.

5. The method of making three strengths of fertilizer from fish by-products according to claim 4, that includes an industrial bag sealer to seal each bag of created minerals;

using two sets of industrial fans to push air into the working environment and to pull air from the working environment.

6. The method of making three strengths of fertilizer from fish by-products according to claim 5, wherein dried fish blood is reconstituted with water.

7. The method of making three strengths of fertilizer from fish by-products according to claim 1, wherein said mineral creation is by placing said fish by-products that are collected in a sack.

8. The method of making three strengths of fertilizer from fish by-products according to claim 7, wherein said fish by-products are separated by type of fish, seaweed and algae.

9. The method of making three strengths of fertilizer from fish by-products according to claim 8, wherein said type of fish including ocean particles with poisonous parts that are placed in said first container.

10. The method of making three strengths of fertilizer from fish by-products according to claim 9, wherein ocean particles without poison are placed in said second container.

11. The method of making three strengths of fertilizer from fish by-products according to claim 8, wherein said ocean particles are further separated as fish scales, fish tongue, fish eyes, field dirt and tree droppings.

12. The method of making three strengths of fertilizer from fish by-products according to claim 1, further includes a manufacturing stage 4 that utilizes minerals that are 11 particle size unit mil grade or more in length and are combined with said second container and said third container, re-heat treated said material at a temperature of 85-115 degrees Centigrade for a period of 5-7 hours.

13. The method of making three strengths of fertilizer from fish by-products according to claim 12, further includes placing said material into a container, removing at least some of the air from said container and sealing said container wherein removing at least some of the air from said container and sealing said container includes an airtight sealing unit that sucks 95% of the air out of the packaging at a temperature of 65 degrees Centigrade or below when said container is sealed.

14. The method of making three strengths of fertilizer from fish by-products according to claim 1, wherein said separation is into three different bins based upon the strength of said collected ocean material wherein a first bin contains fish including ocean particles with poisonous parts, a second bin contains ocean particles without poisonous parts.

15. The method of making three strengths of fertilizer from fish by-products according to claim 1, further includes packaging at least some of said fertilizer in a zip-top sealed package that has 5% or less of air and placing said sealed package in a disposable airtight bag with 30% or less of air.

* * * * *